United States Patent
Paulson et al.

(10) Patent No.: US 7,551,940 B2
(45) Date of Patent: Jun. 23, 2009

(54) TWO-WAY VOICE COMMUNICATION DEVICE HAVING EXTERNAL ACOUSTIC NOISE REDUCTION

(75) Inventors: Mary Paulson, Elk Grove Village, IL (US); Jonathan K. Stewart, Bloomingdale, IL (US); Andrew J. Haapapuro, Arlington Heights, IL (US); Viorel Drambarean, Skokie, IL (US); Robert B. Schulein, Schaumburg, IL (US); Mead C. Killion, Elk Grove Village, IL (US)

(73) Assignee: Etymotic Research, Inc., Elk Grove Village, IL (US)

(*) Notice: Subject to any disclaimer, the term of this patent is extended or adjusted under 35 U.S.C. 154(b) by 0 days.

(21) Appl. No.: 10/755,106

(22) Filed: Jan. 8, 2004

(65) Prior Publication Data

US 2004/0165720 A1    Aug. 26, 2004

Related U.S. Application Data

(60) Provisional application No. 60/439,234, filed on Jan. 9, 2003, provisional application No. 60/451,290, filed on Mar. 1, 2003, provisional application No. 60/507,629, filed on Sep. 30, 2003.

(51) Int. Cl.
*H04M 1/00* (2006.01)
*H04R 25/00* (2006.01)

(52) U.S. Cl. .............. 455/550.1; 455/569.1; 455/569.2; 455/575.1; 455/556.1; 381/370; 381/375; 381/380; 379/430

(58) Field of Classification Search .............. 455/550.1, 455/569.1, 569.2, 570, 575.2, 575.6, 575.1, 455/556.1, 575, 556; 381/370, 375, 380; 379/430

See application file for complete search history.

(56) References Cited

U.S. PATENT DOCUMENTS

| | | | | | |
|---|---|---|---|---|---|
| 4,766,466 | A | * | 8/1988 | Kawai et al. | 355/57 |
| 4,945,191 | A | * | 7/1990 | Satsuka et al. | 174/69 |
| 5,298,692 | A | * | 3/1994 | Ikeda et al. | 381/375 |
| 5,715,321 | A | * | 2/1998 | Andrea et al. | 381/92 |

(Continued)

OTHER PUBLICATIONS

Jabra Corporation, "FreeSpeak BT200", Product Information, copyright 2002.

(Continued)

*Primary Examiner*—Matthew D Anderson
*Assistant Examiner*—Wen W Huang
(74) *Attorney, Agent, or Firm*—McAndrews, Held & Malloy, Ltd.

(57) ABSTRACT

A two-way voice communication device which provides a high-level of acoustic noise reduction is disclosed. A resilient ear tip provides acoustic isolation and secures the earphone within the ear canal of the user. The ability to rotate the earphone within the ear canal allows the user to easily position an attached microphone. The audio signals may be conveyed by an included radio frequency receiver and radio frequency transmitter, or the earphone may be connected to an electrical audio device using a multi-conductor cable. Audio signals may be conveyed to one or both ears of a user. A switch to mute the audio signal from the microphone, or for supporting a push-to-talk mode of operation, may be included in the earphone housing, or on the cable.

37 Claims, 15 Drawing Sheets

U.S. PATENT DOCUMENTS

| | | | | |
|---|---|---|---|---|
| 6,080,110 | A  * | 6/2000 | Thorgersen | 600/500 |
| 6,129,175 | A  * | 10/2000 | Tutor et al. | 181/135 |
| 6,175,633 | B1 * | 1/2001 | Morrill et al. | 381/71.6 |
| 6,320,960 | B1 * | 11/2001 | Lathrop et al. | 379/430 |
| 6,430,217 | B1 * | 8/2002 | Suzuki et al. | 375/219 |
| 6,513,621 | B1 * | 2/2003 | Deslauriers et al. | 181/130 |
| RE38,351 | E  * | 12/2003 | Iseberg et al. | 381/380 |
| 6,729,726 | B2 * | 5/2004 | Miller et al. | 351/158 |
| 6,760,459 | B2 * | 7/2004 | Bae | 381/375 |
| 6,993,144 | B1 * | 1/2006 | Wilson et al. | 381/380 |
| 2002/0131585 | A1 * | 9/2002 | Jones et al. | 379/431 |
| 2002/0181729 | A1 * | 12/2002 | Smith | 381/381 |
| 2002/0193151 | A1 * | 12/2002 | Edreich | 455/569 |
| 2003/0003969 | A1 * | 1/2003 | Tong et al. | 455/568 |
| 2004/0082360 | A1 * | 4/2004 | Gunter et al. | 455/556.1 |
| 2004/0125979 | A1 * | 7/2004 | Elidan et al. | 381/382 |

OTHER PUBLICATIONS

Jabra Corporation, "Jabra EarWrap", Product Information obtained from website on Jan. 9, 2003, http://www.jabra.com/products/jabraearwrap.htm.

Jabra Corporation, "Jabra 2WayBud", Product Information obtained from website on Jan. 8, 2003, http://jabra.com/products/jabra2waybud.htm.

Sony Electronics Inc., "TL-DR150EX" product information obtained from website on Jan. 9, 2003, http://www.sel.sony.com/SEL/consumer/ss5/home/accessories/wispear/tl-dr150ex.shtml.

Sony Electronics Inc., "DR-EX150UP", product information obtained from website on Jan. 9, 2003, http://www.sonystyle.com/is-bin/INTERSHOP.enfinity/eCS/Store/en/-/USD/SY.

Sony Electronics Inc., "wisp.ear Hands-Free Headset TL-DR140", product information obtained from website on Jan. 9, 2003, http://www.sonystyle.com.

* cited by examiner

TWO-WAY VOICE COMMUNICATION DEVICE HAVING EXTERNAL ACOUSTIC NOISE REDUCTION

CROSS-REFERENCE TO RELATED APPLICATIONS/INCORPORATION BY REFERENCE

This application makes reference to, claims priority to, and claims the benefit of U.S. Provisional Patent Application Ser. No. 60/439,234, entitled "Two-Way Voice Communication Device Having External Acoustic Noise Reduction," filed Jan. 9, 2003, U.S. Provisional Patent Application Ser. No. 60/451,290, entitled "Vibration Reduction Cable Design For Insert Type Earphones," filed Mar. 1, 2003, and U.S. Provisional Patent Application Ser. No. 60/507,629, entitled "Noise Canceling Microphone With Acoustically Tuned Ports," filed Sep. 30, 2003, the complete subject matter of each of which is hereby incorporated herein by reference, in its entirety.

FEDERALLY SPONSORED RESEARCH OR DEVELOPMENT

[N/A]

MICROFICHE/COPYRIGHT REFERENCE

[N/A]

BACKGROUND OF THE INVENTION

Earphones typically available for use with portable (e.g., wearable) voice communication equipment are ill fitting, are not designed to couple tightly to the ear opening, and hence provide poor isolation from external audible noise. Headphones are available that cover the outer ear and provide better acoustic isolation, but they are generally bulky and unattractive, and poorly suited for use in many situations where portable voice communications devices are used. In addition, the failure of most earphones to provide sufficient acoustic isolation frequently results in the user compensating by raising the level of the sound, causing ear-overload distortion. The level of the sound relative to the external noise improves, but the quality of the sound is degraded.

Many earphones for use with voice communication equipment attach to the ear with a loop that fits over the top and around the rear of the outer ear, while others use a headband that fits over the top of or behind the head. A representative example of the loop approach is seen in the "EarWrap" by Jabra Corporation, while the model TL-DR140 "wisp.ear" by Sony Electronics is one example of an earphone using a headband. The loop and headband are designed to fit a wide variety of ear and head shapes and sizes, resulting in a poor fit for many users. The earphone with loop easily falls off of the ear, and prolonged use may cause physical irritation. The headband is not well suited for use with headwear and crushes the hair. Still other earphones are held in place using an earmold that fits within the concha, or an "earbud" which is wedged into the opening of the ear canal. Examples of earphones using an earmold method of attachment can be seen in the "2WayBud" and "2WayBoom" earphones manufactured by Jabra Corporation, while the model DR-EX150UP by Sony Electronics employs an earbud. These earphones are typically smaller than those held in place by a loop or headband, are generally less physically secure and are easily pulled from the ear by the attached cable, and afford the user no appreciable exclusion of external acoustic noise. The presence of the boom frequently used to position a microphone near the mouth of the user exacerbates the problem of poor fit and attachment to the ear, frequently causing the earphone to loosen and fall from the ear.

To eliminate problems caused by a microphone boom, many earphones for use with cellular telephones use a microphone positioned along the earphone cable near the mouth of the user. This arrangement provides some improvement over the typical earphone with microphone boom, but suffers from a lack of accuracy in microphone position, resulting in wide variations in the level of the user's voice. Users of such devices are frequently seen manipulating the earphone cable in order to position the microphone more accurately.

The cable that typically runs from the earphone to the associated electrical device may be a significant source of the noise plaguing a user. Longitudinal forces created when the earphone cable comes in contact with surrounding objects or with the clothing of the user are normally conducted along the cable to the earphone housing, where they are audible to the user. This can be an annoying source of noise.

An additional area for improvement relates to the receiver used within the earphone. Earphone receivers are typically designed to be driven from either a voltage source or a current source. In designing a voltage-driven receiver, many manufacturers select for the receiver electromagnet the largest diameter coil wire that will produce the required sound level within the available space. The use of the largest wire reduces the chance of wire breakage during manufacture, maximizing yield. This also results in a receiver with the lowest possible D.C. resistance. The receiver impedance varies over the range of operating frequencies, with the lowest impedance occurring at the lowest frequency. In a voltage-driven design, the largest coil current will occur at the lowest frequency, resulting in an earphone having an undesirable low-frequency boost. To reduce this effect, many manufacturers place a resistor in series with the receiver coil. This has several disadvantages including the cost of the resistor, the space required for the resistor, and possible failure of the resistor and its connections. It would be advantageous to find a way to eliminate the need for this resistor.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a two-way voice communication device comprising a receiver for transducing a first electrical signal into sound, and an ear tip for insertion into an ear canal of a user, the ear tip, upon insertion into the ear canal, securing the device in an operable position on the head of the user without requiring use of additional attachment to the user. The ear tip may provide a reduction of external acoustic noise of at least 7 dB, and may comprise 19 dB. Such an embodiment may also comprise a microphone for transducing speech of the user into a second electrical signal, a switch for canceling the second electrical signal, and a boom for supporting the microphone, where the boom may be deformed in order to place the microphone nearer the mouth of the user. An embodiment of the present invention may comprise a switch supporting a push-to-talk mode of operation, a second receiver for transducing a third electrical signal into sound, and a second ear tip for insertion into a second ear canal of a user. The first electrical signal and the third electrical signal may be the same signal.

Another embodiment of the present invention may comprise a radio frequency receiver for demodulating a first radio frequency signal into the first electrical signal, and a radio frequency transmitter for transmitting a second radio frequency signal, wherein the second radio frequency signal is modulated to carry the second electrical signal. The radio frequency communication may be compliant with the Bluetooth radio frequency communication standard. An embodiment may comprise a cable having a plurality of electrical conductors for carrying at least the first and second electrical signals, the cable having a first end and a second end, the first end attached to the earphone and the second end for connection to an electrical audio device, and the cable may have a coiled portion nearest the first end for reducing the audible effects of physical contact of objects with the cable. The cable may comprise a switch for canceling the second electrical signal, and may comprise a switch supporting a push-to-talk mode of operation.

An embodiment in accordance with the present invention may comprise a receiver for transducing a first electrical signal into sound, an ear piece for transmitting the sound into the ear canal of a user, a microphone for transducing speech of the user into a second electrical signal, and a cable for carrying at least the first and second electrical signals, the cable having a coiled portion nearest an end proximate the ear piece for reducing the audible effects of physical contact of objects with the cable. It may further comprise a boom for supporting the microphone, and the boom may be deformed in order to place the microphone nearer the mouth of the user. Such an embodiment may also comprise a switch for canceling the second electrical signal, and a switch supporting a push-to-talk mode of operation.

Additional aspects of the present invention may be seen in a two-way voice communication device comprising a receiver for transducing a first electrical signal into sound, an ear tip for insertion into an ear canal of a user, the ear tip, upon insertion into the ear canal, securing the device in an operable position on the head of the user without requiring additional attachment to the user. Such an embodiment may have a microphone for transducing speech of the user into a second electrical signal, and may provide a reduction of external acoustic noise of greater than 7 dB. In an embodiment of the present invention, the reduction of external acoustic noise may comprise 19 dB. Various embodiments of the present invention may comprise a boom for supporting the microphone. An embodiment may comprise a radio frequency receiver for demodulating a first radio frequency signal into the first electrical signal, and a radio frequency transmitter for transmitting a second radio frequency signal, wherein the second radio frequency signal is modulated to carry the second electrical signal.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate to an earphone for use with voice communication equipment such as cellular telephones. In particular, certain embodiments relate to earphones that provide both a high level of external acoustic noise exclusion and improved support for the earphone and an integral microphone.

Figure 1A:
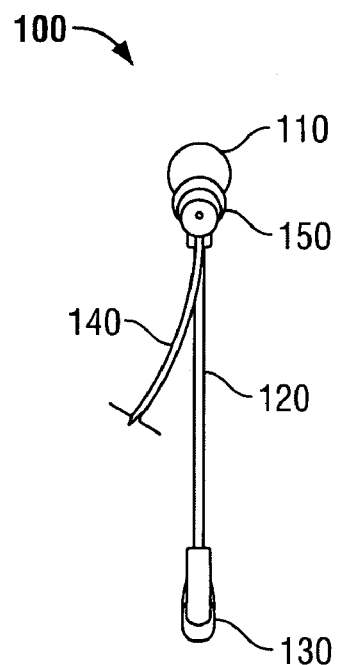
FIGS. 1A and 1B illustrate two views of an exemplary embodiment of a two-way voice communication device having an external acoustic noise reducing insert earphone assembly in accordance with the present invention.
Figure 1B:
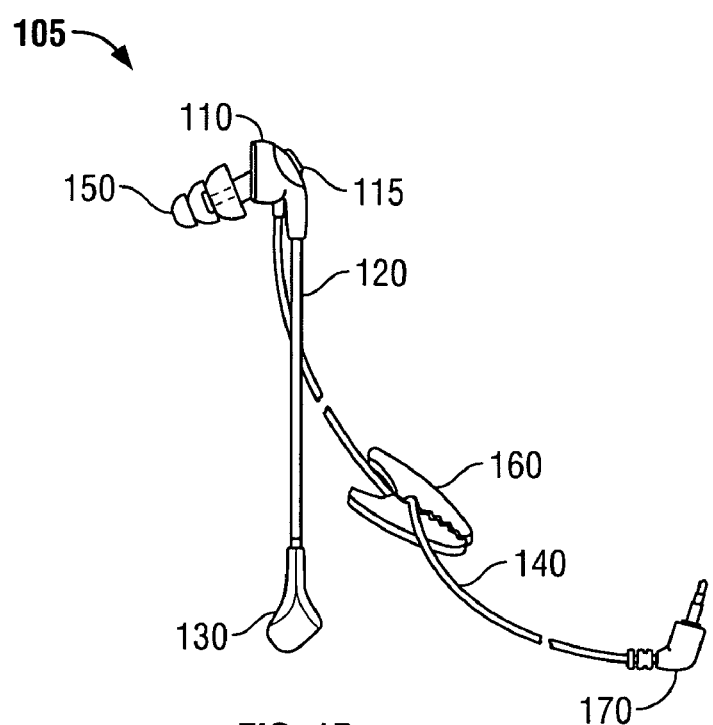

FIGS. 1A and 1B illustrate two views of an exemplary embodiment of a two-way voice communication device having a external acoustic noise reducing insert earphone assembly in accordance with the present invention. In the illustrated embodiment, earphone assembly 105 includes housing 110 with attached ear tip 150 for insertion within the ear canal of the user. Microphone 130 is located at one end of boom 120, the other end of which is attached to housing 110. Multi-conductor cable 140 connects earphone assembly 105 to an external electrical audio device through connector 170. Button 115 may be used to mute the audio signal from microphone 130. Clip 160 may be included to secure multi-conductor cable 140 to the clothing of the user.

Figure 2:
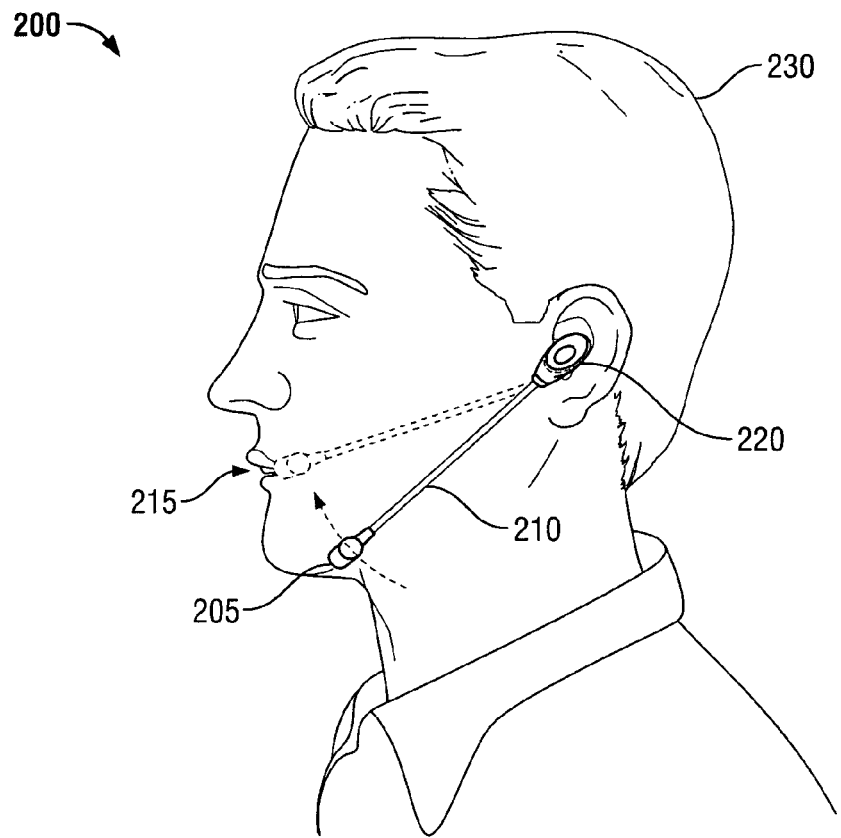
FIG. 2 is a side view of the head of a user, illustrating positioning of the microphone in close proximity with the mouth of the user by rotating the earphone of an embodiment in accordance with the present invention.

FIG. 2 is a side view of the head of a user, illustrating positioning of the microphone in close proximity with the mouth of the user by rotating the earphone of an embodiment in accordance with the present invention. In the illustration, earphone 220 is supported within the ear canal of a user and provides both external acoustic noise reduction and physical attachment, without the need for another means to affix the earphone to the ear. In other words, in this embodiment, nearly the entire assembly, including microphone 205, boom 210, and earphone 220, is supported during use solely by the ear canal of a user. Insertion of earphone 220 within the ear canal provides external acoustic noise exclusion and physical attachment to the head of the user superior to that of prior art solutions using, for example, earmolds or earbuds.

Positioning of microphone 205 in close proximity with the mouth 215 of user 230 may be accomplished in such an embodiment by rotating the earphone 220 within the ear canal of user 230. As can be seen in FIG. 2, rotation of earphone 220 permits the user to raise and lower the position of microphone 205 relative to mouth 215. Boom 210 of an embodiment of the present invention may be fabricated to allow user 230 to deform boom 210 in order to flexibly position microphone 205 closer or further from mouth 215. The use of a directional (i.e., noise canceling) microphone for microphone 205, combined with the ability to flexibly position microphone 205 with respect to the mouth 215, permits a user of an embodiment of the present invention to adjust the position of microphone 205 so as to minimize speech noises (e.g., resulting from unintentional spitting and explosive utterances such as the letter "p"), while still providing a desirable speech signal level. An example of such a noise canceling microphone may be found in U.S. Provisional Patent Application Ser. No. 60/507,629, entitled "Noise Canceling Microphone With Acoustically Tuned Ports," filed Sep. 30, 2003, the complete subject matter of which is hereby incorporated herein by reference, in its entirety. Microphone 205 may also be a directional microphone located within the housing of earphone 220, without departing from the spirit of the present invention. In either case, the rotation of earphone 220 within the ear canal of the user permits the user to optimize the pickup of sound energy from the mouth 215 of user 230 by microphone 205.

Figure 3:
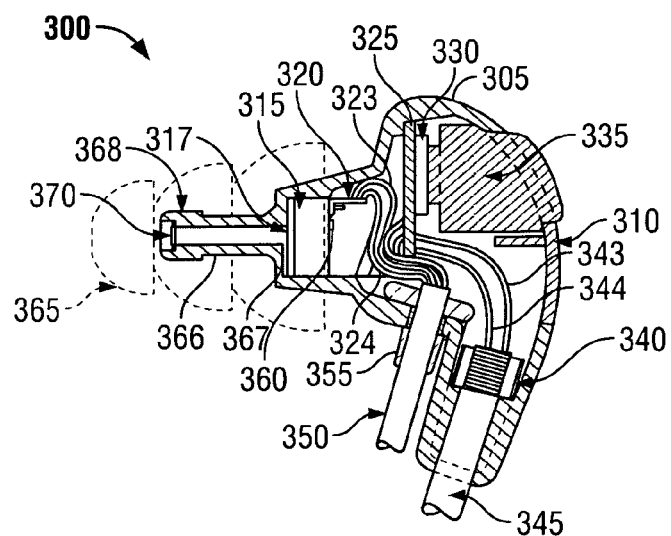
FIG. 3 is a cross-sectional view of the earphone portion of an embodiment in accordance with the present invention.

FIG. 3 shows a cross-sectional view of the earphone portion of an embodiment in accordance with the present invention. Earphone assembly 300 corresponds to, for example, housing 110 and ear tip 150 as depicted in FIG. 1, or earphone 220 in FIG. 2. In the exemplary embodiment, earphone assembly 300 comprises housing 305, cap 310, receiver 315, printed circuit board 325 with switch 305, button 335, and ear tip 365. Electrical signals from an external electrical audio device are carried by designated conductors within multi-conductor cable 350, and through wires 323 and 324 to receiver 315, which operates to convert the received electrical signals to an acoustic signal that is emitted at sound port 317. Receiver 315 is positioned within housing 305 in order that sound port 317 is closely coupled to one end of sound tube 366. Sound tube 366 directs the acoustic energy from sound port 317 of receiver 315 to pass through damper 370 and into the ear canal of a user. Ear tip 365 is made of a resilient material which conforms to the exterior of sound tube 366 and is secured to sound tube 366 by protrusion 368, which may engage a matching recess in the cylindrical opening in ear tip 365. Although the exemplary embodiment of FIG. 3 shows ear tip 365 as having three flanges, ear tip 365 may have a greater or lesser number of flanges without departing from the spirit of the present invention. When inserted within the ear canal of the user, the exterior protrusions of ear tip 365 compress and provide a highly effective seal, excluding external acoustic noise while securing the earphone assembly to the ear of the user.

The electrical signal from a microphone such as microphone 130 of FIG. 1 or microphone 205 of FIG. 2 may be carried on conductors 343 and 344, shown entering housing 310 through boom 345. Boom 345 may be secured to housing 310 using position clamp 340. Muting of the microphone electrical signals on conductors 343 and 344 may be provided by switch 330. In the exemplary embodiment, switch 330 is mounted to printed circuit board 325 and is positioned so that pressure applied to button 335 activates switch 330. When not activated, switch 330 permits electrical signals on microphone wires 343 and 344 to be applied to designated conductors within multi-conductor cable 350. Multi-conductor cable 350 is also depicted as multi-conductor cable 140 in FIG. 1. When activated, switch 330 may stop the electrical signals of microphone 130 from reaching the designated conductors of multi-conductor cable 350, effectively muting microphone 130. This feature is important for users in a noisy environment, to allow them to reduce the noise heard by the distant party, or the noise experienced by the earphone user as sidetone. It may also be of importance in situations where portions of local conversations should not be heard by the distant party. In another embodiment, switch 330 may be positioned at a different location on housing 310, or at some point along multi-conductor cable 350, without departing from the spirit of the invention. In yet another embodiment of the present invention, switch 330 may be arranged to provide push-to-talk functionality. Such an arrangement is desirable where control of an accompanying device such as, for example, an aircraft communication system or a personal radio transceiver, is required. If present, one end of multi-conductor cable 350 may be secured to housing 305 by strain relief 355, while the other end may be equipped with a connector such as connector 170 as shown in FIG. 1.

Figure 4:
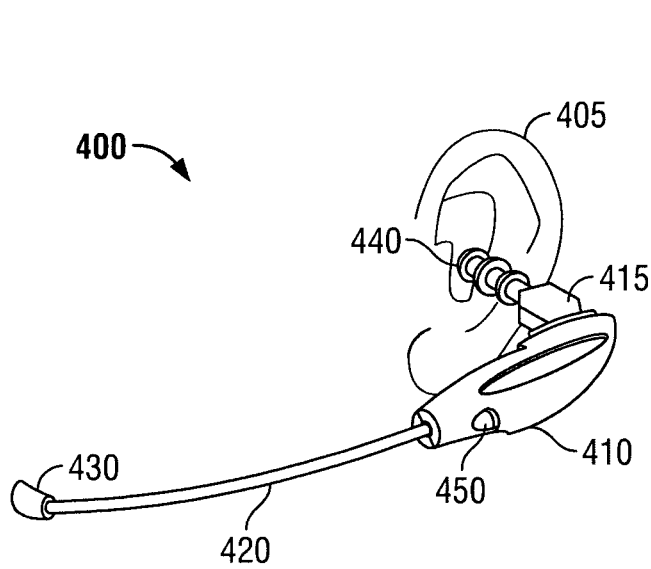
FIG. 4 shows a further embodiment in accordance with the present invention, where a radio receiver and transmitter may be used to communicate signals to the receiver and from the microphone, in place of the multi-conductor cable of FIG. 3.

FIG. 4 shows a further embodiment in accordance with the present invention in which a radio frequency receiver and radio frequency transmitter are used to communicate signals to receiver 415 and from the microphone 430, in place of multi-conductor cable 350 of FIG. 3. In FIG. 4, ear tip 440 has been inserted within the ear canal of the ear 405 of a user. Ear tip 440 is attached to housing 410, which may contain a radio frequency transmitter and radio frequency receiver such as one complying with, for example, the Bluetooth radio frequency communication standard. This would permit the earphone to be used with Bluetooth-compatible devices such as the ever increasing number of Bluetooth-compatible cellular handsets that are now becoming available. The earphone may also be used with other Bluetooth-compatible radio communication equipment, laptop computers, and the like. Earphone 400 may include a light emitting diode (LED) 450 to indicate, for example, that the earphone is in use, and the status of a battery. Microphone 430 may be positioned within close proximity to the user's mouth by rotating housing 410 and attached ear tip 440 within the ear canal of a user. Further adjustment of the position of microphone 430 may be made by deforming flexible boom 420. In such an embodiment, electrical signals from microphone 430 modulate the radio frequency signal generated by the radio frequency transmitter contained within housing 410. The radio frequency receiver contained with housing 410 demodulates a received radio frequency signal into an electrical signal that is converted to sound by receiver 415 in housing 410.

Figure 5:
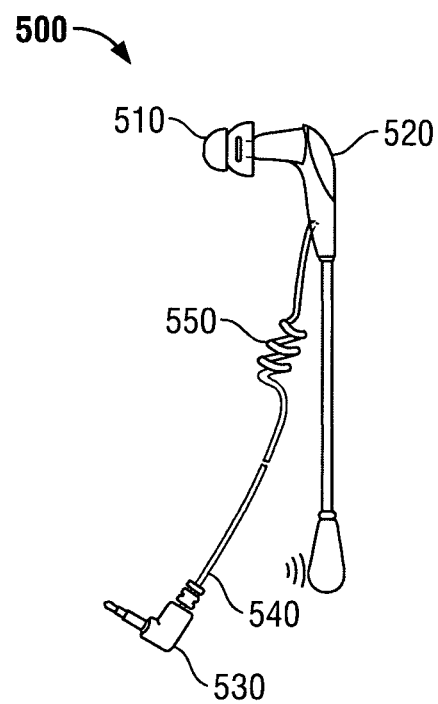
FIG. 5 shows yet another embodiment of the present invention in which the cable connecting the earphone housing to the connector includes a coiled section used to reduce the audible noise created by physical contact of the cable with nearby objects or the clothing of a user.
Figure 5A:
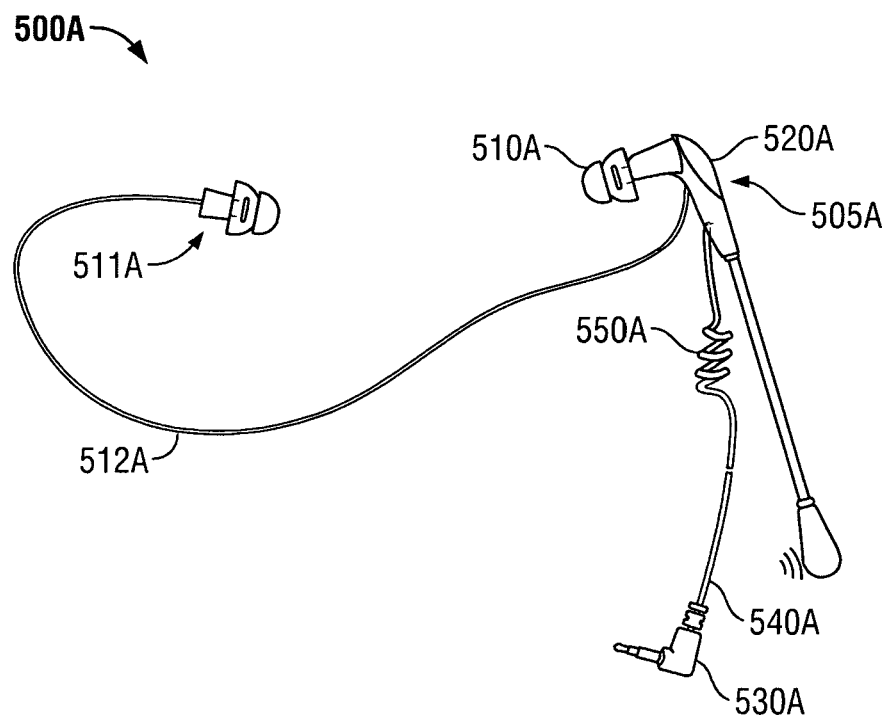
FIG. 5A illustrates an exemplary two-way voice communication device in which a second insert earphone is electrically coupled by a multi-conductor cable to the circuitry of a first insert earphone in order to support the reproduction of stereo or bi-monaural audio signals, in accordance with an embodiment of the present invention.

FIG. 5 shows yet another embodiment of the present invention where the cable 540 connecting earphone housing 520 to connector 530 includes a coiled section 550 used to reduce the audible noise created by physical contact of the cable 540 with nearby objects or the clothing of a user. The improved external noise reduction inherent in the insert earphone shown in FIG. 5, combined with the presence within the ear canal of ear tip 510 may make contact of cable 540 with other objects more audible. Coil 550 reduces the effects of such contact by converting the longitudinal forces in the cable 540 into twisting and bending forces within coil 550. This attenuates the audible noise conducted through cable 540 to earphone housing 520, reducing the level of noise at ear tip 510. Although the coil 550 is shown in the illustration as having three turns, the coil 550 may have a lesser or greater number of turns without departing from the spirit of the present invention. A more detailed description of a coil such as the coil 550 of FIG. 5 can be found in U.S. Provisional Patent Application Ser. No. 60/451,290, entitled "Vibration Reduction Cable Design For Insert Type Earphones," filed Mar. 1, 2003, the complete subject matter of which is hereby incorporated herein by reference, in its entirety FIG. 5A illustrates an exemplary two-way voice communication device 500A in which a second insert earphone 511A is electrically coupled by a multi-conductor cable 512A to the circuitry of a first insert earphone 505A in order to support the reproduction of stereo or bi-monaural audio signals, in accordance with an embodiment of the present invention. It should be noted that the multi-conductor cable 512A provides a path for the electrical signals needed to operate second insert earphone 511A, and is not used for support of either the first insert earphone 505A, or the second insert earphone 511A. In addition, the routing of the multi-conductor cable 512A is not limited to the arrangement shown in FIG. 5A, but may, for example, also be configured over-the-head, under the chin, or behind the neck of the user. The housing 520A, ear tip 510A, connector 530A, cable 540A, and coil 550A of FIG. 5A may, for example, correspond to the housing 520, ear tip 510, connector 530, cable 540, and coil 550 of the two-way voice communication device of FIG. 5. Although the illustration of FIG. 5A shows the multi-conductor cable 512A connecting to the circuitry within the housing 520A of the first insert earphone 505A, the connection may, for example, be made at the connector 530A, or at a point along the cable 540A, without departing from the spirit of the present invention. The availability of the second insert earphone 511A permits a user to enjoy the audio playback capabilities of increasingly popular cellular phone models having MP3 playback functionality, in addition to its use as a two-way voice communication device. Also, the acoustic noise reduction provided by the second insert earphone 511A, coupled with the bi-monaural audio available during normal cellular use provides a user in a noisy environment with significantly improved intelligibility of the far-end party.

In yet another embodiment of the present invention, the second insert earphone 511A may be replaced with a noise reducing earplug such as, for example, a model ER-20 Hi-Fi Earplug by Etymotic Research. In such an embodiment, the multi-conductor cable 512A may comprise a flexible cord for securing the noise reducing earplug 512A to the housing 520A of the first insert earphone 505A. This embodiment may be particularly desirable in situations where a user in a noisy environment has a need to be able to engage in two-way voice communication using a cellular phone or radio, and also has a need to be able to communicate with those around them.

Figure 5B:
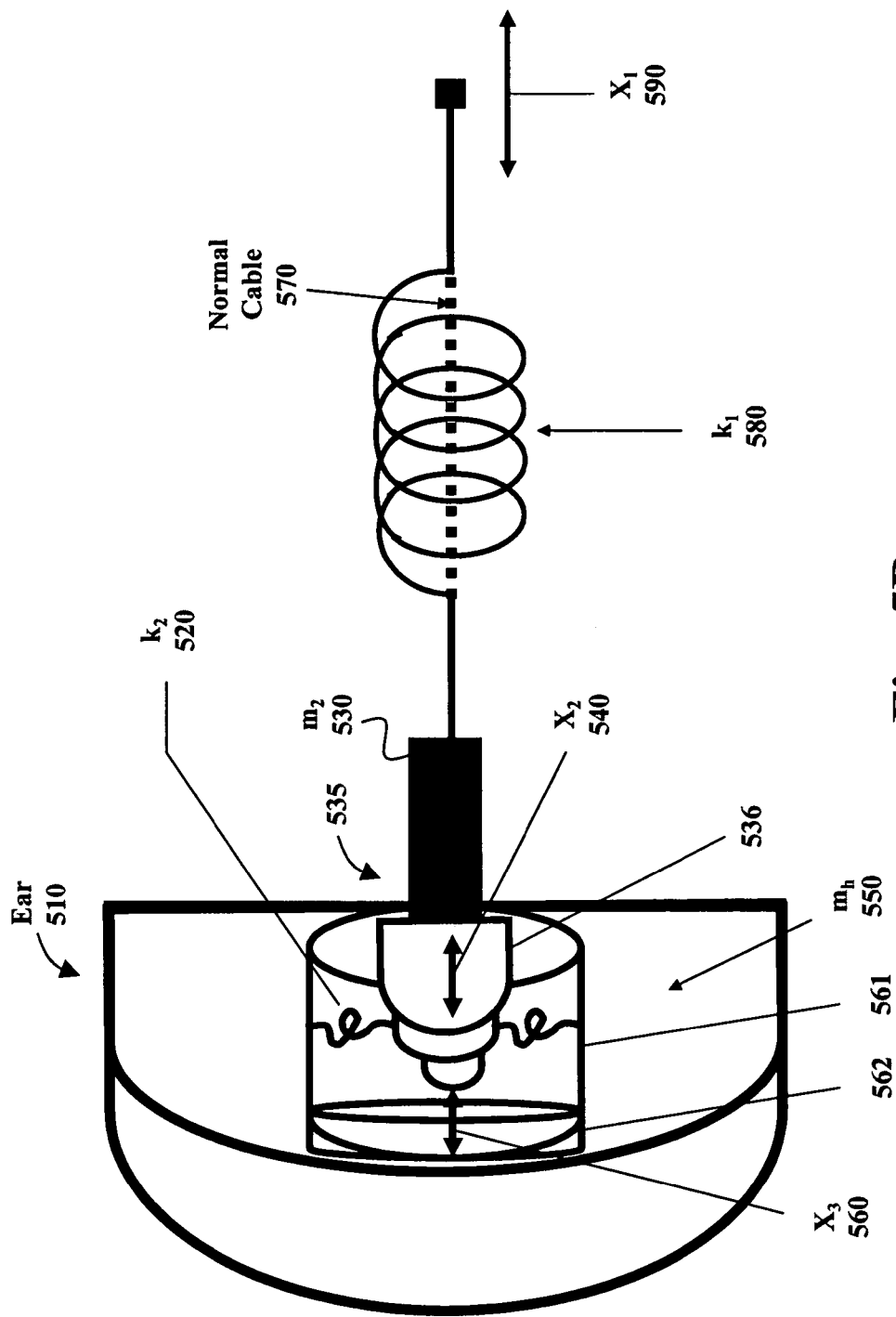
FIG. 5B illustrates the primary vibration path between a cable assembly and listener in accordance with one embodiment of the present invention.

FIG. 5B illustrates the primary vibration coupling path between any cable assembly and listener in accordance with one embodiment of the present invention. As illustrated, cable motion due to vibration, designated $X_1$ 590, is coupled to the listener's eardrum, by means of a direct connection of the cable assembly 570 to the insert type earphone 535. As the vibration travels along the cable 570, it moves the insert earphone 535, which is sealed in the ear canal by a compliant tip (i.e., ear tip portion 536). As illustrated, $k_2$ 520 is determined by the compliant seal between the ear tip portion 536 of insert earphone 535 and the ear canal 561; $X_2$ 540 represents the motion of the insert earphone 535, $m_2$ 530 represents the mass of the insert earphone assembly 535; and $m_h$ 550 represents the mass of the listener's head, which is assumed to be very large compared to the insert earphone 535. Because $m_h$ 550 is significantly larger than $m_2$ 530, it is assumed that $m_h$ 550 is essentially at rest. As the ear tip portion 536 of the insert earphone 535 moves, it modulates the pressure in the ear canal 561, which in turn modulates the eardrum, the motion of the ear drum designated $X_3$ 560. This results in an annoying sound, with significant high frequency content. Including a spring-like compliant member $k_1$ 580 of appropriate value, has the ability to significantly reduce $X_3$ 560 and hence the disturbing sounds.

Figure 5C:
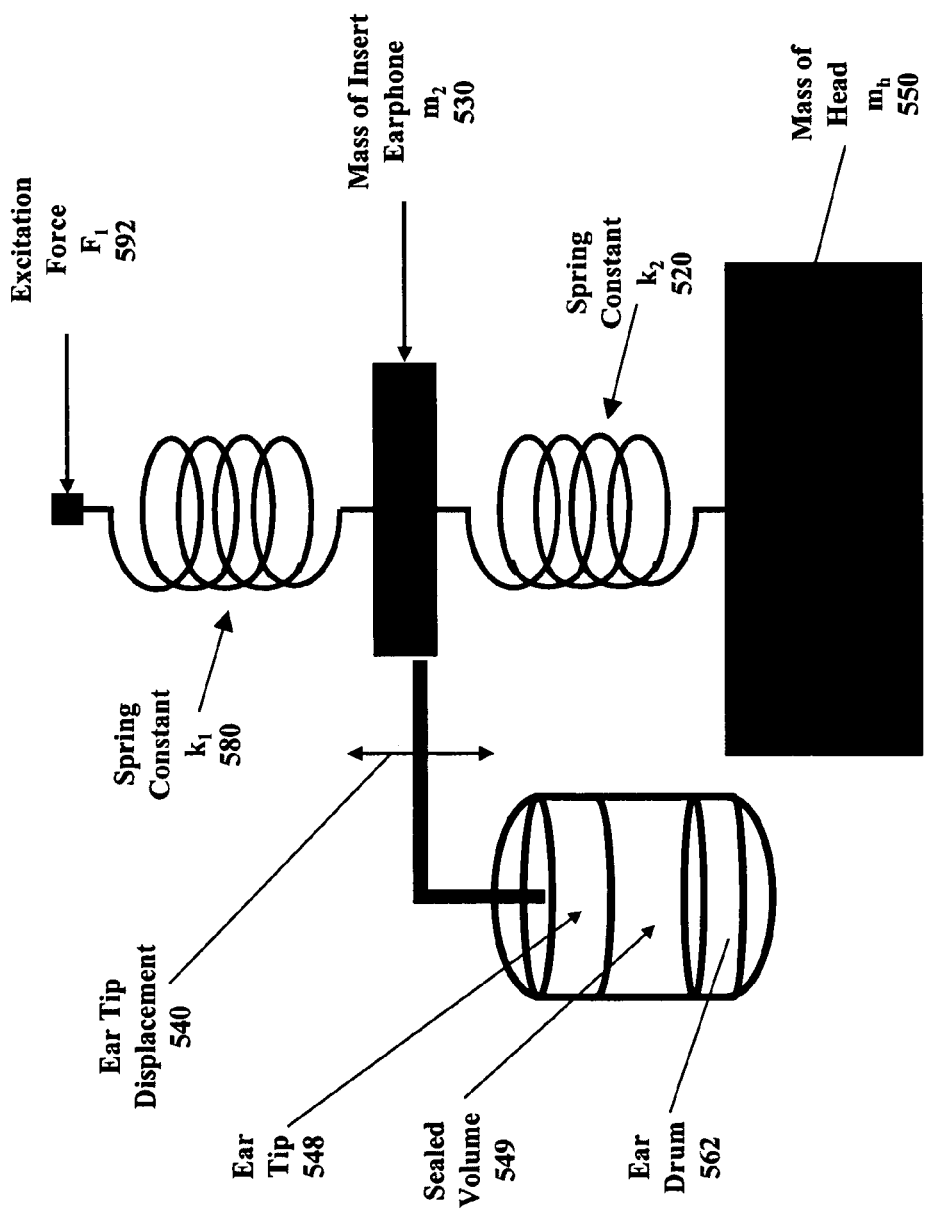
FIG. 5C illustrates the equivalent mechanical system of a cable assembly and assumptions in accordance with one embodiment of the present invention.

FIG. 5C illustrates the equivalent mechanical system of a cable assembly and assumptions in accordance with one embodiment of the present invention. Based on the illustrated cable assembly, it is clear that the motion of the ear tip 548 and the insert earphone mass $m_2$ 530, designated by the ear tip displacement 540, may be reduced in amplitude as the value of the spring constant $k_1$ 580 decreases in magnitude, where: $k_1 = -F/X$. Disregarding all other factors, the most compliant spring (i.e., coil) provides the greatest isolation. Such a spring however would be impractical due to sag under normal operating conditions. It should be appreciated that one preferred embodiment of the present invention would include a spring or coil that offers a desirable level of improvement while at the same time providing a stable device that does not interfere with the normal operation of the earphones.

Figure 5D:
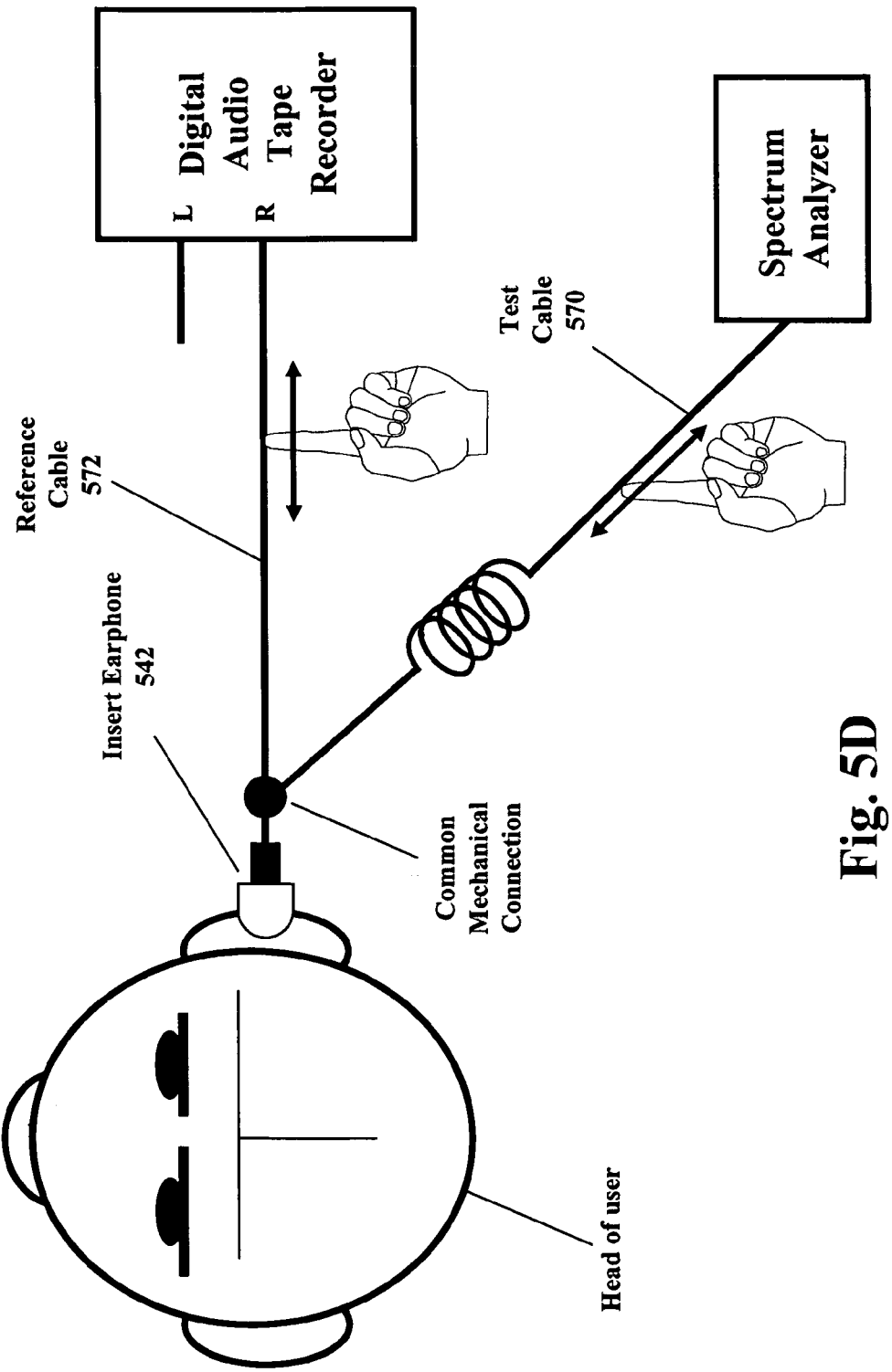
FIG. 5D illustrates the measurement set up to evaluate the effectiveness of various coils in accordance with the present invention.

FIG. 5D illustrates a measurement set up to evaluate the effectiveness of various coils in accordance with the present invention. As a cable 572, 570 is rubbed using fingers for example, the output of the receiver (e.g., transducer in insert earphone 542) is a relative measure of the sound level in the ear. By comparing various cable and coil structures, a spectral measure of effectiveness may be obtained. In this embodiment, it should be appreciated that transducers may be used in a reverse fashion as a microphone.

Figure 5E:
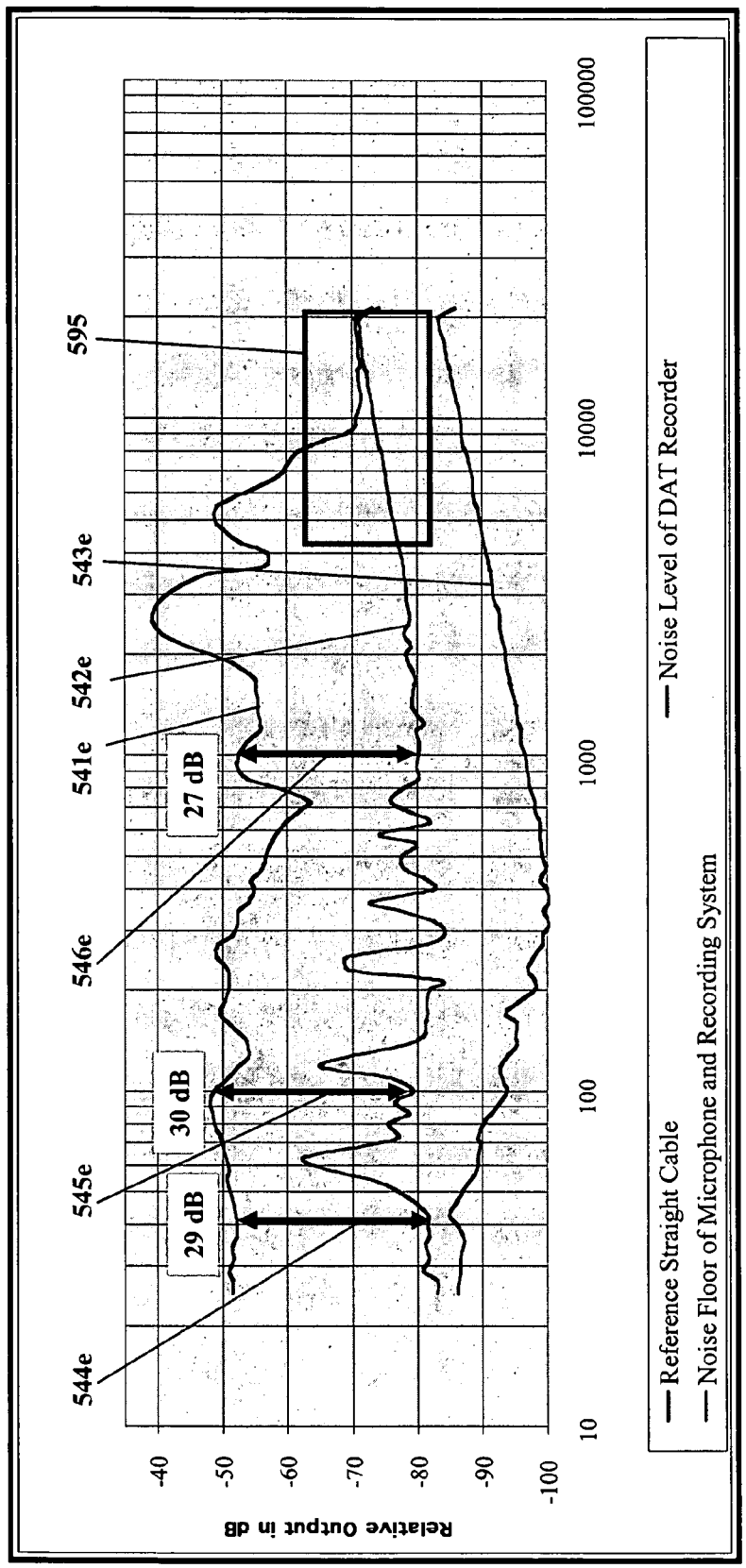
FIG. 5E shows a graph illustrating the measurement system capabilities showing vibration sensitivity of a reference straight cable vs. noise level of the measurement system of FIG. 5E.
Figure 5F:
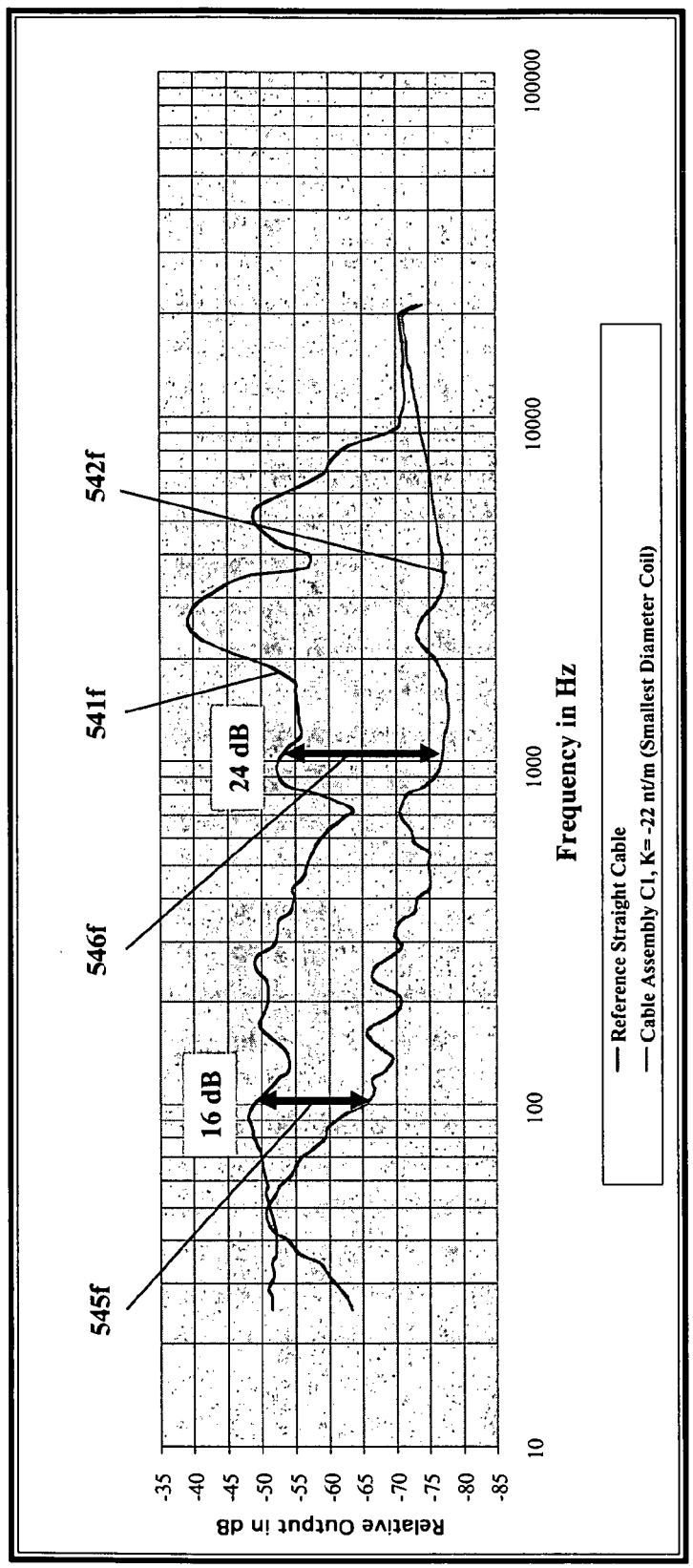
FIG. 5F shows a graph illustrating the reduction in the level of external vibration noise that may be provided by one embodiment of the present invention.

FIG. 5E shows a graph illustrating the measurement system capabilities showing vibration sensitivity of a reference straight cable 541e vs. noise level of the measurement system 543e of FIG. 5D. Curve 542e shows the noise floor of the microphone and recording system. Curve 543e shows the noise floor of the digital audio tape (DAT) recorder illustrated in FIG. 5D. Region 595 illustrates that the data is no doubt better than measured due to noise floor limitations. FIG. 5F. shows a graph illustrating a curve 541f for a reference straight cable and a curve 542f for a cable assembly C1, and the reductions 545f, 546f in the level of external acoustic noise that may be provided by one embodiment of a cable assembly having a coil assembly (designated C1) in accordance with the present invention. In this embodiment, k=−22 nt/m.

Figure 5G:
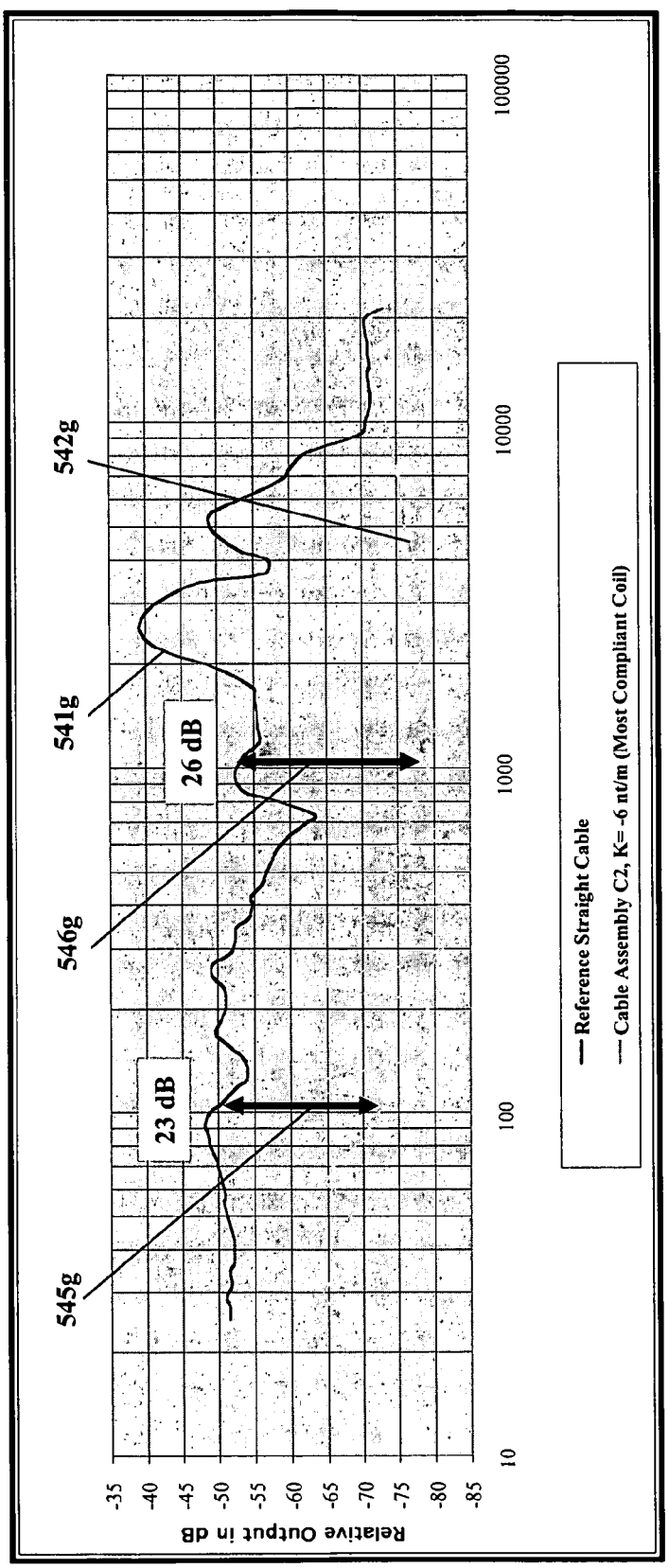
FIG. 5G shows a graph illustrating the reduction in the level of external vibration noise that may be provided by another embodiment of the present invention.
Figure 5H:
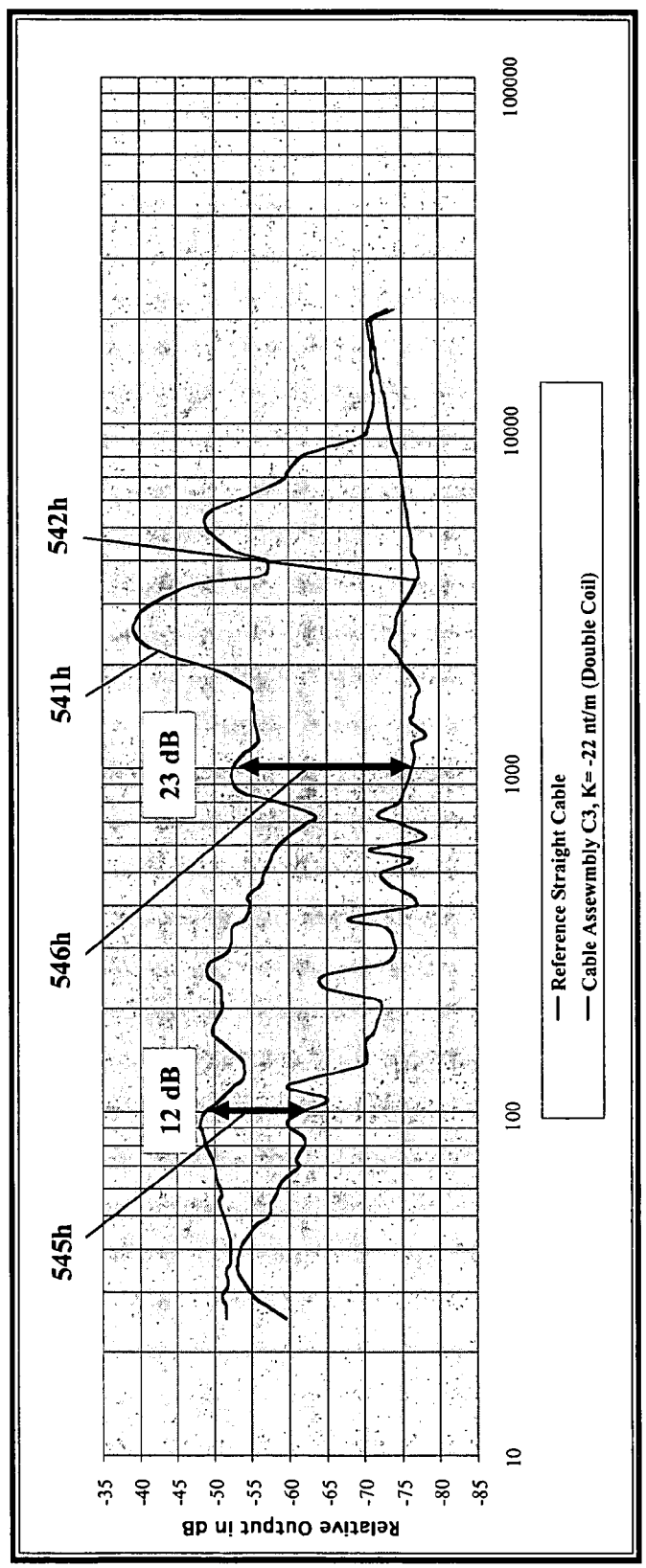
FIG. 5H shows a graph illustrating the reduction in the level of external vibration noise that may be provided by yet another embodiment of the present invention.
Figure 5I:
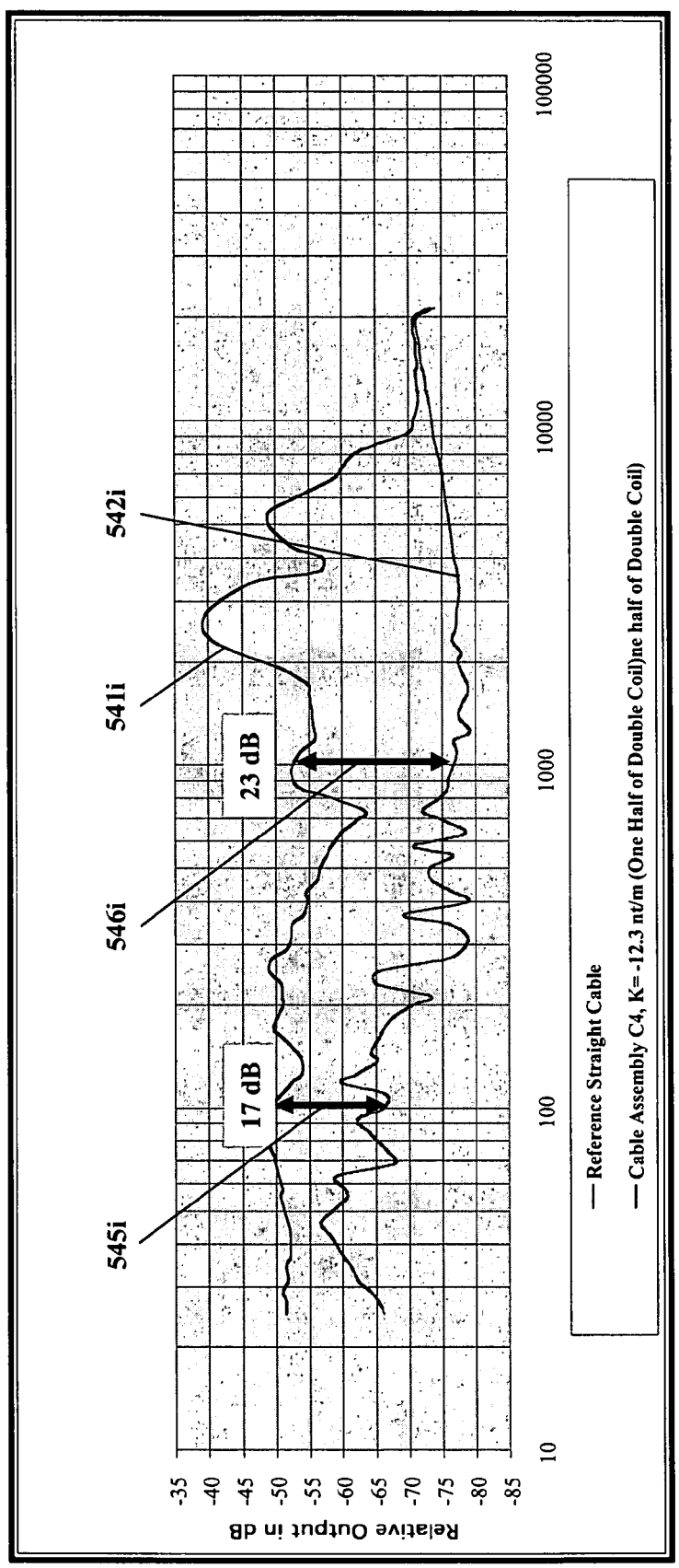
FIG. 5I shows a graph illustrating the reduction in the level of external vibration noise that may be provided by still another embodiment of the present invention.

FIG. 5G shows a graph illustrating the reductions 545g, 546g in the level of external acoustic noise that may be provided by another embodiment of a cable assembly having a coil assembly (designated C2) in accordance with the present invention. FIG. 5G shows a curve 541g for a reference straight cable and a curve 542g for the cable assembly designated C2. In this embodiment, k=−6 nt/m. FIG. 5H shows a graph illustrating the reductions 545h, 546h in the level of external acoustic noise that may be provided by still another embodiment of a cable assembly having a coil assembly (designated C3) in accordance with the present invention. FIG. 5H shows a curve 541h for a reference straight cable and a curve 542h for the cable assembly designated C3, employing a double coil. In this embodiment, k=−22 nt/m. FIG. 5I shows a graph illustrating the reductions 545i, 546i in the level of external acoustic noise that may be provided by still another embodiment of a cable assembly having a coil assembly (designated C4) in accordance with the present invention. FIG. 5I shows a curve 541i for a reference straight cable and a curve 542i for the cable assembly designated C4 employing one-half of a double coil. In this embodiment, k=−12.3 nt/m.

Figure 5J:
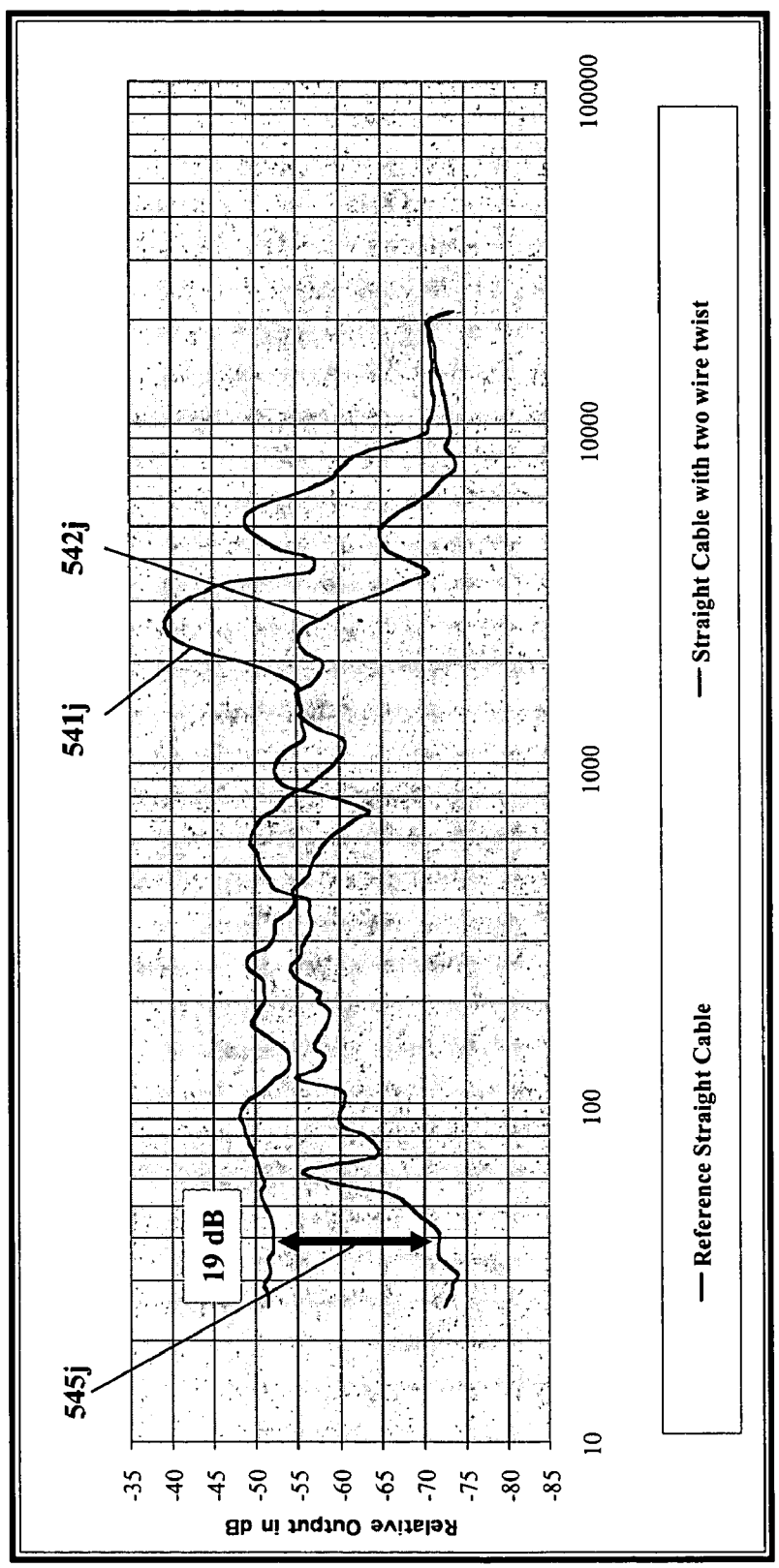
FIG. 5J shows a graph illustrating the performance of a small diameter two wire twisted pair in accordance with the present invention.
Figure 5K:
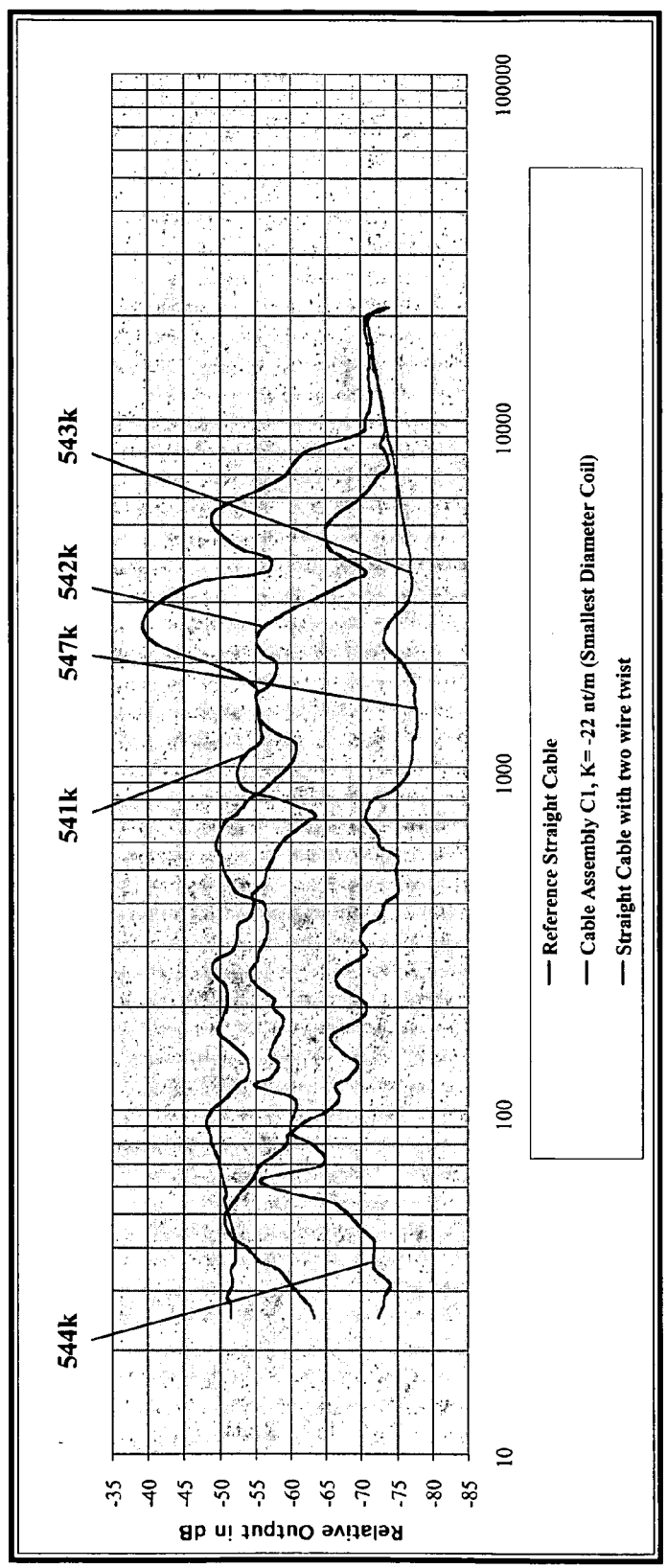
FIG. 5K illustrates the potential improvement using a combination of two wire twisted cable with small diameter coil cord in accordance with the present invention.

FIG. 5J shows a graph illustrating the performance 545j of a small diameter two wire twisted pair in accordance with the present invention. The curve 541j represents a reference straight cable, while curve 542j represents a straight cable with a two wire twist. FIG. 5K illustrates the potential improvement at points 544k and 547k using a combination of a two wire twisted cable with a small diameter coil cord. Curve 541k represents a reference straight cable. Curve 542k represents a cable assembly (designated C1) as described above having k=−22 nt/m. Curve 543k represents straight cable with two wire twist.

Figure 6:
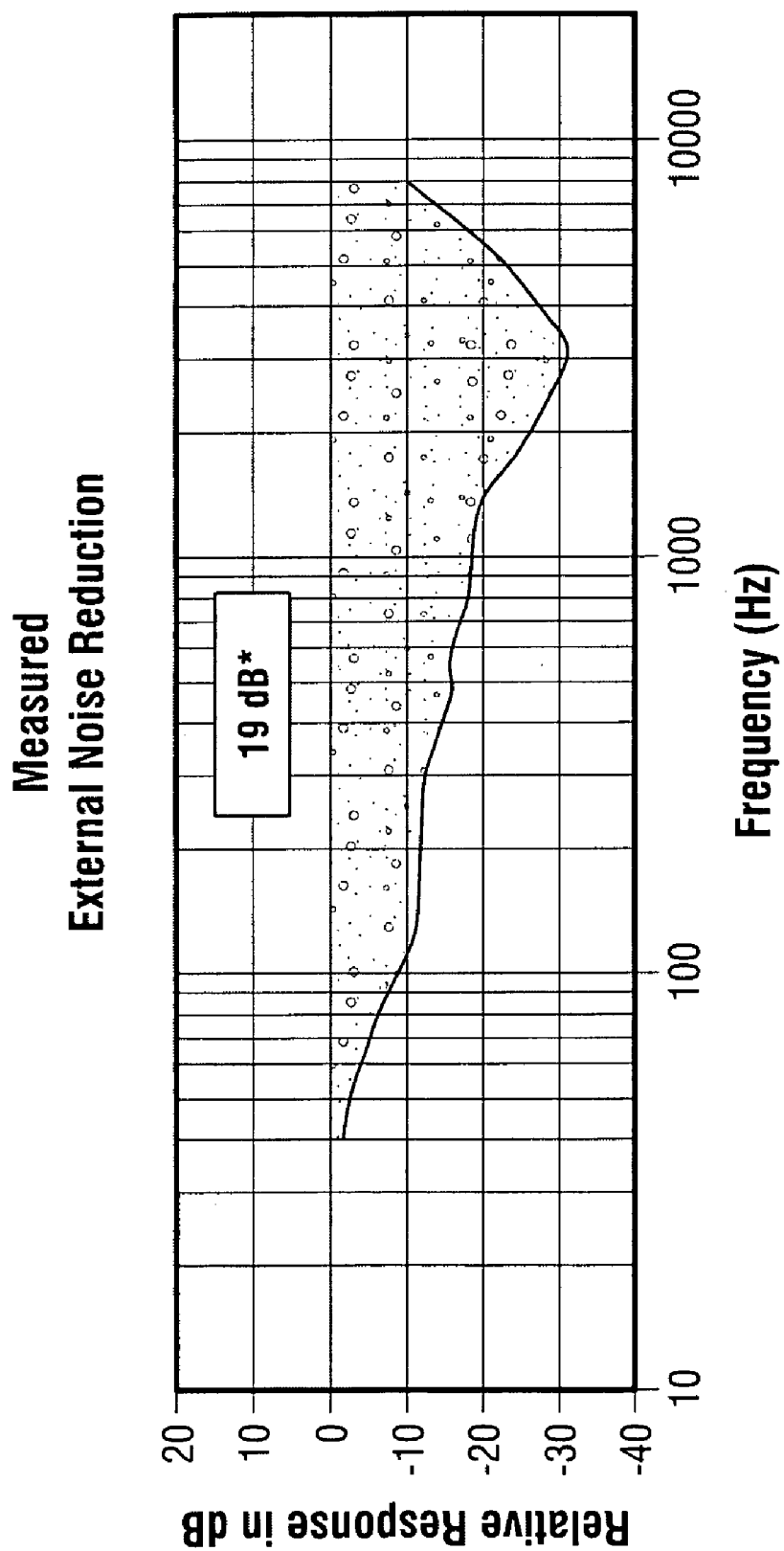
FIG. 6 shows a graph of the reduction in the level of external acoustic noise that may be provided by an embodiment of the present invention.

FIG. 6 shows a graph illustrating the reduction in external acoustic noise that may be provided by an embodiment of the present invention. The level of external noise reduction provided by such an embodiment was verified using in-ear measurements. Test subjects were placed within a reverberation room in which a calibrated 84 dB sound pressure level broadband pink noise was generated. The sound pressure level developed in the ear of each subject was measured using a test microphone positioned deep within the ear canal. The external noise reduction of the earphone was calculated as the difference between the level in the open ear and the level with the earphone in place measured at octave frequencies between 125 Hz and 4 kHz. The average attenuation for the earphone was then calculated from the six octave measurements. The present invention enables reduction of external noise at amounts greater than 7 dB, which is a significant improvement over existing voice communication equipment mentioned above. One embodiment of the present invention reduced external acoustic noise by approximately 19 dB (FIG. 6).

Figure 7:
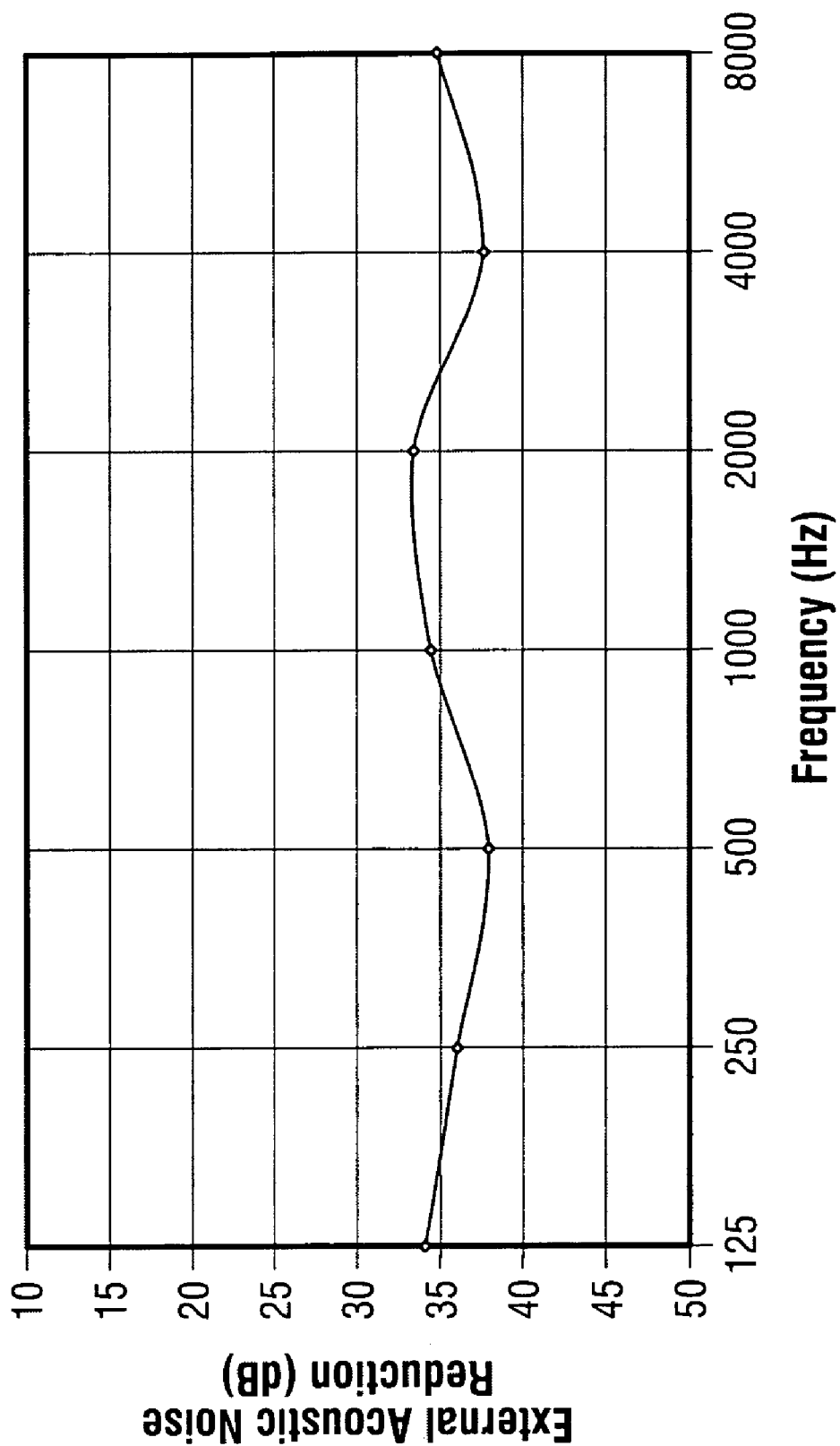
FIG. 7 is a graph illustrating test results demonstrating the external noise reduction performance of another two-way voice communication device in accordance with an embodiment of the present invention.

FIG. 7 is a graph illustrating test results demonstrating the external noise reduction performance of another two-way voice communication device in accordance with an embodiment of the present invention. Using the averaging calculation described above upon the data presented in the illustration of FIG. 7, it can be seen that an embodiment of the present invention may provide an average reduction in external acoustic noise of approximately 36 dB. The same test results may be used to determine that the performance of an embodiment of the present invention may be expressed as having a noise reduction rating (NRR) of approximately 23 (per U.S. Environmental Protection Agency—1979, "Noise Labeling Requirements for Hearing Protectors", Fed. Reg. 44(190), 40 C.F.R Part 211, pp. 56130-56147). The additional reduction in acoustic noise provided by an embodiment of the present invention permits the user to operate the device at a lower volume setting, reducing the likelihood of the hearing damage that may be caused when a user raises the level of a voice signal to overcome external noise. In addition, the lower signal level avoids ear overload distortion, resulting in user perception of improved sound quality and intelligibility.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A two-way voice communication device comprising:
   a receiver for transducing a first electrical signal into sound;
   an ear tip for insertion into an ear canal of a user, wherein the ear tip is rotatable in the ear canal of the user, the ear tip, upon insertion into the ear canal, uses the ear canal to provide support of the device, thereby securing the device in an operable position on the head of the user without requiring use of additional attachment to the user, the ear tip providing a reduction of external acoustic noise of at least 7 dB; and
   a microphone for transducing speech of the user into a second electrical signal, wherein the microphone is positionable relative to the mouth of the user by rotating the ear tip in the ear canal of the user.

2. The two-way voice communication device of claim 1 wherein the reduction of external acoustic noise comprises 36 dB.

3. The two-way voice communication device of claim 1 further comprising a boom for supporting the microphone.

4. The two-way voice communication device of claim 3 wherein the boom is a flexible boom that is deformable to allow adjustment of the distance between the microphone and the mouth of the user.

5. The two-way voice communication device of claim 1, further comprising a switch for canceling the second electrical signal.

6. The two-way voice communication device of claim 1, further comprising a switch supporting a push-to-talk mode of operation.

7. The two-way voice communication device of claim 1 further comprising a radio frequency receiver for demodulating a first radio frequency signal into the first electrical signal.

8. The two-way voice communication device of claim 1 further comprising a radio frequency transmitter for transmitting a second radio frequency signal, wherein the second radio frequency signal is modulated to carry the second electrical signal.

9. The two-way voice communication device of claim 7 or claim 8 wherein the radio frequency communication is compliant with the Bluetooth radio frequency communication standard.

10. The two-way voice communication device of claim 1 further comprising a cable having a plurality of electrical conductors for carrying at least the first and second electrical signals, the cable having a first end and a second end, the first end attached to the earphone and the second end for connection to an electrical audio device.

11. The two-way voice communication device of claim 10, wherein the cable has a coiled portion nearest the first end for reducing the audible effects of physical contact of objects with the cable, the coiled portion having a spring constant of between approximately −6 nt/m and approximately −22 nt/m.

12. The two-way voice communication device of claim 10 wherein the cable further comprises a switch for canceling the second electrical signal.

13. The two-way voice communication device of claim 10 wherein the cable further comprises a switch supporting a push-to-talk mode of operation.

14. The two-way voice communication device of claim 1 further comprising:
a second receiver for transducing a third electrical signal into sound; and
a second ear tip for insertion into a second ear canal of a user.

15. The two-way voice communication device of claim 14 wherein the first electrical signal and the third electrical signal are the same signal.

16. The device of claim 1, wherein the ear tip comprises a plurality of flanges that, upon insertion into the ear canal, compress, thereby securing the device.

17. A two-way voice communication device comprising:
a receiver for transducing a first electrical signal into sound;
an ear tip for transmitting the sound into the ear canal of a user, wherein the ear tip is rotatable in the ear canal of the user, and wherein the ear tip, upon insertion into the ear canal, uses the ear canal to provide sole support of the device, thereby securing the device in an operable position on the head of the user without requiring use of additional attachment to the user; and
a microphone for transducing speech of the user into a second electrical signal, wherein the microphone is positionable relative to the mouth of the user by rotating the ear tip in the ear canal of the user.

18. The two-way voice communication device of claim 17 further comprising a boom for supporting the microphone.

19. The two-way voice communication device of claim 18 wherein the boom is a flexible boom that is deformable to allow adjustment of the distance between the microphone and the mouth of the user.

20. The two-way voice communication device of claim 17 further comprising a switch for canceling the second electrical signal.

21. The two-way voice communication device of claim 17 further comprising a switch supporting a push-to-talk mode of operation.

22. The device of claim 17, wherein the ear tip comprises a plurality of flanges that, upon insertion into the ear canal, compress, thereby securing the device.

23. A two-way voice communication device comprising:
a receiver for transducing a first electrical signal into sound;
an ear tip for insertion into an ear canal of a user, wherein the ear tip is rotatable in the ear canal of the user, and wherein the ear tip, upon insertion into the ear canal, uses the ear canal to provide sole support of the device, thereby securing the device in an operable position on the head of the user without requiring use of additional attachment to the user;
a microphone for transducing speech of the user into a second electrical signal, wherein the microphone is positionable relative to the mouth of the user by rotating the ear tip in the ear canal of the user; and
the device providing a reduction of external acoustic noise of at least 7 dB.

24. The two-way voice communication device of claim 23 wherein the reduction of external acoustic noise comprises 36 dB.

25. The two-way voice communication device of claim 23 further comprising a boom for supporting the microphone.

26. The two-way voice communication device of claim 23 further comprising a radio frequency receiver for demodulating a first radio frequency signal into the first electrical signal.

27. The two-way voice communication device of claim 23 further comprising a radio frequency transmitter for transmitting a second radio frequency signal, wherein the second radio frequency signal is modulated to carry the second electrical signal.

28. The device of claim 23, wherein the ear tip comprises a plurality of flanges that, upon insertion into the ear canal, compress, thereby securing the device.

29. A two way voice communication device comprising:
a receiver for transducing a first electrical signal into sound;
an ear tip for insertion within an ear canal of a user, wherein the ear tip is rotatable in the ear canal of the user, the ear tip, upon insertion within the ear canal, uses the ear canal to provide support of the device, thereby securing the device in an operable position on the head of the user without requiring use of additional attachment to the user;
a microphone for transducing speech of the user into a second electrical signal, wherein the microphone is positionable relative to the mouth of the user by rotating the ear tip in the ear canal of the user;
a housing arranged to contain at least the receiver and having a passageway for directing sound from the receiver to the ear tip for transmission into the ear canal; and
a cable for carrying at least the first and second electrical signals.

30. The device of claim 29, wherein the device comprises a boom for supporting the microphone near the mouth of the user.

31. The device of claim 30 wherein the boom is a flexible boom that is deformable to allow adjustment of the distance between the microphone and the mouth of the user.

32. The device of claim 29, wherein the housing comprises a switch for user control of the second electrical signal.

33. The device of claim 29, wherein the cable comprises a cable portion adjacent to the housing, the cable portion having a spring constant in a range effective for reducing audible effects of physical contact with the remainder of the cable.

34. The device of claim 33, wherein the cable portion has a spring constant of between approximately −6 nt/m and approximately −22 nt/m.

35. The device of claim 29, wherein the device, upon insertion of ear tip within the ear canal of the user, provides a reduction of external acoustic noise of at least 7 dB.

36. The device of claim 35, wherein the reduction of external acoustic noise is at least 36 dB.

37. The device of claim 29, wherein the ear tip comprises a plurality of flanges that, upon insertion into the ear canal, compress, thereby securing the device.

* * * * *